United States Patent
Fee et al.

(10) Patent No.: US 6,317,232 B1
(45) Date of Patent: Nov. 13, 2001

(54) BI-DIRECTIONAL ALL-OPTICAL REGENERATOR

(75) Inventors: John A. Fee; Andrew Niall Robinson, both of Plano, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/047,637

(22) Filed: Mar. 25, 1998

(51) Int. Cl.$^7$ ........................................... H04J 14/02
(52) U.S. Cl. ................................. 359/124; 359/127
(58) Field of Search ................... 359/158, 176, 359/177, 127

(56) References Cited

U.S. PATENT DOCUMENTS

| | | | | |
|---|---|---|---|---|
| 4,586,186 | * | 4/1986 | Anderson | 375/3 |
| 4,677,618 | * | 6/1987 | Haas et al. | 371/1 |
| 4,768,202 | * | 8/1988 | Lacroix et al. | 375/3.1 |
| 5,157,530 | * | 10/1992 | Loeb et al. | 359/124 |
| 5,369,520 | | 11/1994 | Avramopoulos et al. | 359/176 |
| 5,446,573 | | 8/1995 | Lomashevitch et al. | 359/158 |
| 5,774,246 | * | 6/1998 | Bulow | 359/139 |
| 5,930,017 | * | 7/1999 | Davis et al. | 359/128 |
| 6,044,122 | * | 3/2000 | Ellersick et al. | 375/360 |

OTHER PUBLICATIONS

S. Bigo et al., "All–optical regnerator for 20 Gbit/s trans-oceanic transmission," Electronics Letters, vol. 33, No. 11, pp. 975–976, May 22, 1997.*

* cited by examiner

Primary Examiner—Jason Chan
Assistant Examiner—Christina Y. Leung (57) ABSTRACT

An all-optical system for regenerating a first optical signal carried in a first direction on an optical transmission medium and a second optical signal carried in a second direction on the optical transmission medium includes a bi-directional clock recovery loop and a bi-directional optical gate. The bi-directional clock recovery loop includes a first optical clock recovery circuit for recovering a first clock signal from the first optical signal and a second optical circuit for recovering a second clock signal from the second optical signal. The first and second optical circuits of the clock recovery loop share at least some common optical circuit elements. The bi-directional optical gate includes a first non-linear optical light mirror circuit for producing a first regenerated signal based on the first optical signal and the first clock signal and a second non-linear optical light mirror circuit for producing a second regenerated signal based on the second optical signal and the second clock signal. The first and second non-linear optical light mirror circuits share at least some common optical circuit elements.

27 Claims, 3 Drawing Sheets

BI-DIRECTIONAL ALL-OPTICAL REGENERATOR

FIELD OF THE INVENTION

The present invention relates generally to methods and systems for regenerating optical signals, and more particularly to a bi-directional all-optical regenerator.

DESCRIPTION OF THE PRIOR ART

Optical fiber systems have become the physical transport medium of choice in long distance telephone and data communication networks. However, a problem with optical fiber systems is dispersion, which causes the optical pulses to spread. The original optical fiber systems include, in addition to a light transmitter and a light receiver connected by optical fiber, repeaters at various points along the optical fiber path. Repeaters are optical-electrical devices that include a receiver and a transmitter in series with circuitry for amplifying, reshaping, and retiming the signal. The receiver part of the repeater converts the signal on the optical fiber from the optical domain to the electrical domain and the transmitter converts the signal from the electrical domain back to the optical domain. The retiming and reshaping circuitry processes the signal prior to retransmission.

Recently, optical network operators have proposed and have begun to introduce all-optical systems. An all-optical system does not include electro-optical repeaters. Rather, all-optical systems use optical line amplifiers, such as rare earth-doped fiber amplifiers, to amplify the optical signals along the route.

Optical amplifiers simply amplify the signal and do not include any means for reshaping or retiming the signal. Accordingly, dispersion can be a severe problem in all-optical systems. One solution to chromatic dispersion in all-optical systems is disclosed in U.S. Pat. No. 5,430,822, which discloses dispersion compensating optical fibers. By inserting an appropriate length of dispersion compensating optical fiber into an optical system, dispersion related signal degradation can be compensated.

In addition to dispersion compensating fiber, there has been disclosed in U.S. Pat. No. 5,369,520 an optical regenerator. A regenerator differs from a line amplifier in that it not only strengthens the amplitude of the signal, but also reshapes the pulses and removes timing jitter. The regenerator of the '520 patent includes an electrical-optical clock recovery stage and a Sagnac loop optical gate stage. The clock recovery stage generates a periodic optical pulse that matches the clock signal that underlies the incoming data signal. The clock signal is used in the optical gate to generate a retimed regenerated output signal.

The purpose of the Sagnac loop of the '520 patent is to use the on-off state of the data signal to meter out single pulses of the clock signal. The clock signal recovered by the electrical-optical clock recovery stage enters the Sagnac loop through a coupler where it is split evenly and traverses the loop in both directions. The signal halves from each direction reconverge at the same optical coupler, and because of their phasing and the fact that they have passed through identical paths, they recombine to couple all of the energy back into the original input port. As long as the loop is kept symmetrical and there is no data signal, the other port from the coupler does not output any clock pulses. The data signal is propagated over a portion of the loop. As a data "one" pulse propagates through a portion of the loop, it travels along side one of the clock signal halves and imparts a phase shift, due to non-linearity of the shared fiber material known as the Kerr effect. The counter-propagating clock signal half is essentially unaffected by the data signal. When the clock signal halves recombine at the coupler, the imbalance introduced by the data signal causes the clock pulse to emerge from the output port of the coupler. Thus, a data signal is used to gate out high quality clock pulses.

Recently, there has been proposed an all-optical regenerator that includes an optical clock recovery stage and an optical gate stage. The clock recovery stage is an optical ring with an amplifier and a variable delay line. The size of the ring is selected so that a light pulse makes a complete cycle through the ring during one bit period of the expected incoming data signal, or an integral multiple thereof. The variable delay line is used to fine tune the ring delay with respect to the incoming signal. The optical ring and amplifier form a ring laser that is modulated into a circulating pulse by copropagating it with the incoming data signal. The incoming data signal is amplified and coupled into the clock recovery ring where it shares paths with a portion of the ring laser through a section of optical fiber. The circulating clock and passing data signals are amplified to sufficient levels to cause the material in the shared fiber path to exhibit a non-linear refractive index the Kerr effect. The non-linearity provides a venue for cross modulation. The clock recovery stage includes two outputs. One is a strong, idealized pulse stream from the ring laser representing the recovered clock signal. The other is a sample of the data signal after going through a portion of the ring. Both of these signals are fed into the optical gate stage, which is a Sagnac loop or non-linear optical loop mirror (NOLM).

An all-optical regenerator includes several expensive, specialized optical components and acts only on a single optical carrier channel. Each channel requires a separate set of equipment. Additionally, to regenerate carriers traveling in opposite directions, two complete regenerator sets occupying two spaces in an equipment rack are required for each carrier. Thus, regenerators are expensive in terms of both cost and space. It is an object of the present invention to reduce the number of optical components required to regenerate more than one optical carrier.

SUMMARY OF THE INVENTION

The present invention provides an all-optical system for regenerating a first optical signal carried in a first direction on an optical transmission medium and a second optical signal carried in a second direction on the optical transmission medium. The system includes a bi-directional clock recovery loop and a bi-directional optical gate. The bi-directional clock recovery loop includes a first optical clock recovery circuit for recovering a first clock signal from the first optical signal and a second optical circuit for recovering a second clock signal from the second optical signal. The first and second optical circuits of the clock recovery loop share at least some common optical circuit elements. The bi-directional optical gate includes a first non-linear optical light mirror circuit for producing a first regenerated signal based on the first optical signal and the first clock signal and a second non-linear optical light mirror circuit for producing a second regenerated signal based on the second optical signal and the second clock signal. The first and second non-linear optical light mirror circuits share at least some common optical circuit elements.

The bi-directional clock recovery loop includes a first optical signal input arranged to receive the first signal and a second optical signal input arranged to receive the second signal. The clock recovery loop outputs the first clock signal at a first recovered clock signal output and the second clock signal at a second recovered clock signal output. The clock recovery loop also outputs the first optical signal at a first optical signal output and the second optical signal at a second optical signal output.

The bi-directional optical gate includes a first recovered clock signal input coupled to the first recovered clock signal output of the bi-directional clock recovery loop and a second recovered clock signal input coupled to the second recovered clock signal output of the bi-directional clock recovery loop. The optical gate also includes a first optical signal input coupled to the first optical signal output of the bi-directional clock recovery loop and a second optical signal input coupled to the second optical signal output of the bi-directional clock recovery loop. The optical gate outputs the first regenerated optical signal at a first regenerated signal output and the second regenerated optical signal output at a second regenerated optical signal output.

DESCRIPTION OF THE PREFERRED EMBODIMENT

Figure 1:
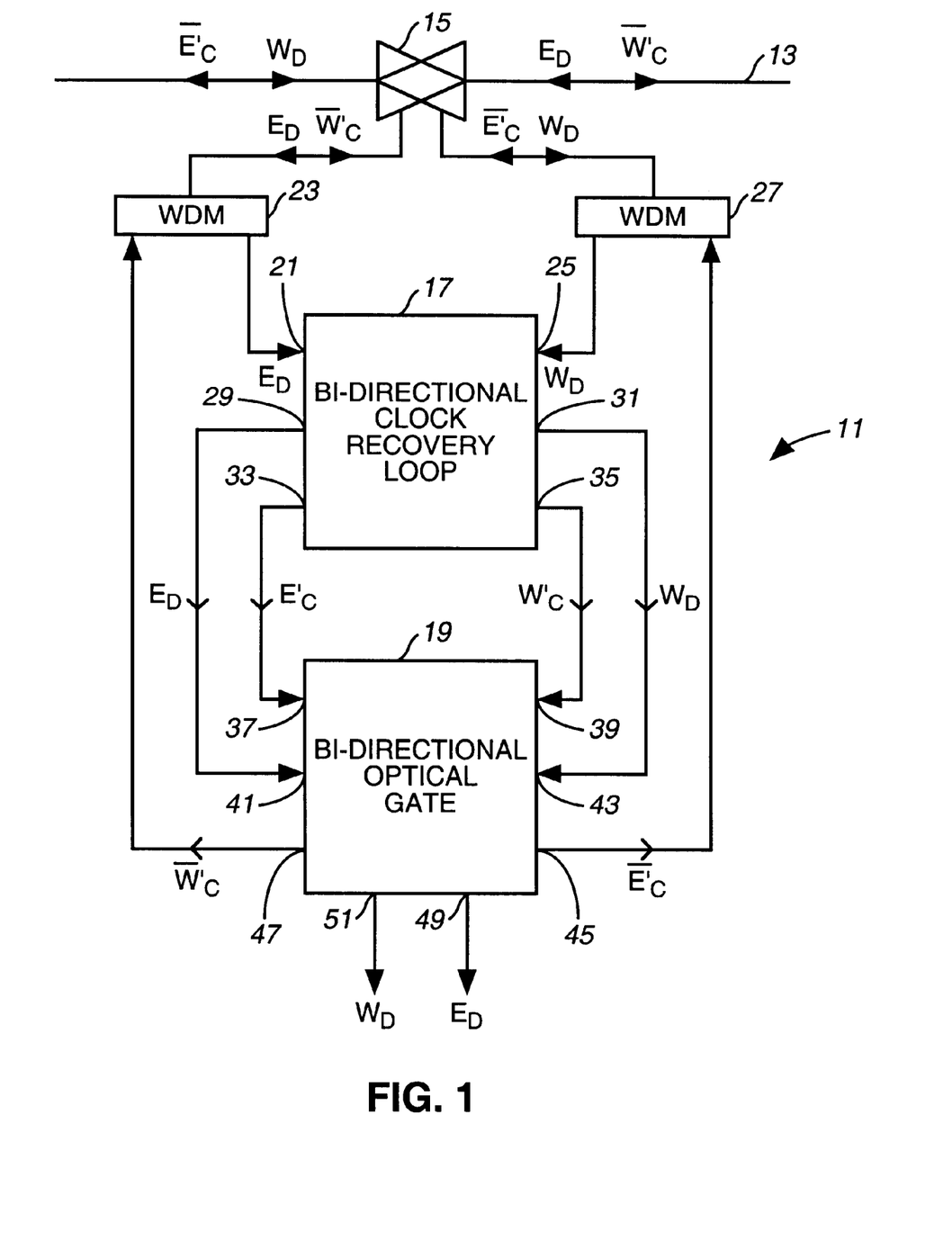
FIG. 1 is a high level block diagram of a bi-directional all-optical regenerator according to the present invention.

Referring now to the drawings, and first to FIG. 1, bi-directional all-optical regenerator is designated generally by the numeral 11. Regenerator 11 is coupled to an optical transmission cable 13 through a bi-directional line amplifier 15. Optical fiber 13 carries a first data signal $E_D$ from east to west and a second data signal $W_D$ from west to east. As will be explained in detail hereinafter, regenerator 11 processes $W_D$ and $E_D$ into regenerated signals $\overline{W'_C}$ and $\overline{E'_C}$, respectively.

In the drawings, $E_D$ represents the east data signal and $W_D$ represents the west data signal. $E'_C$ represents a recovered clock signal based upon $E_D$ and $W'_C$ represents the recovered clock signal based upon $W_C$. The prime indicates that the recovered clock signal has a wave length that is different from the original data signal from which it is recovered. $\overline{E'_C}$ is the regenerated east data signal and $\overline{W'_C}$ is the regenerated west data signal.

Regenerator 11 includes a bi-directional clock recovery loop 17 and a bi-directional optical gate 19. The details of the circuitry of clock recovery loop 17 and optical gate 19 will be discussed in detail with respect to the embodiments of FIGS. 2 and 3. Generally, clock recovery loop 17 includes a first optical signal input 21, which receives optical signal $E_D$ through a wavelength division multiplexer (WDM) 23, and a second optical signal input 25, which receives optical signal $W_D$ through a WDM 27. Clock recovery loop 17 includes a first optical signal output 29, which outputs data signal $E_D$, and a second optical signal output 31, which outputs data signal $W_D$. Finally, clock recovery loop 17 includes a first recovered clock signal output 33, which outputs recovered clock signal $E'_C$, and a second recovered clock signal output 35, which outputs recovered clock signal $W'_C$.

Optical gate 19 includes a first clock signal input 37, which is coupled to receive clock signal $E'_C$ and a second clock signal input 39, which is coupled to receive clock signal $W'_C$. Optical gate 19 also includes a first optical signal input 41, which receives signal $E_D$, and a second optical signal input 43, which receives optical signal $W_D$. As will be explained in detail hereinafter with respect to FIGS. 2 and 3, optical gate 19 combines optical signal $E_D$ and clock $E'_C$ to produce a regenerated signal $\overline{E'_C}$ at a first regenerated optical signal output 45. Similarly, optical gate 19 combines data signal $W_D$ and clock $W'_C$ to produce a regenerated signal $\overline{W'_C}$ at a second regenerated signal output 47. Regenerated signal $\overline{E'_C}$ is coupled back to optical fiber 13 through WDM 27 and regenerated signal $\overline{W'_C}$ is coupled back into optical fiber 13 through WDM 23. Optical gate 19 finally includes a first optical signal output 49, which outputs optical signal $E_D$ and a second optical signal output 51, which outputs optical signal $W_D$.

Figure 2:
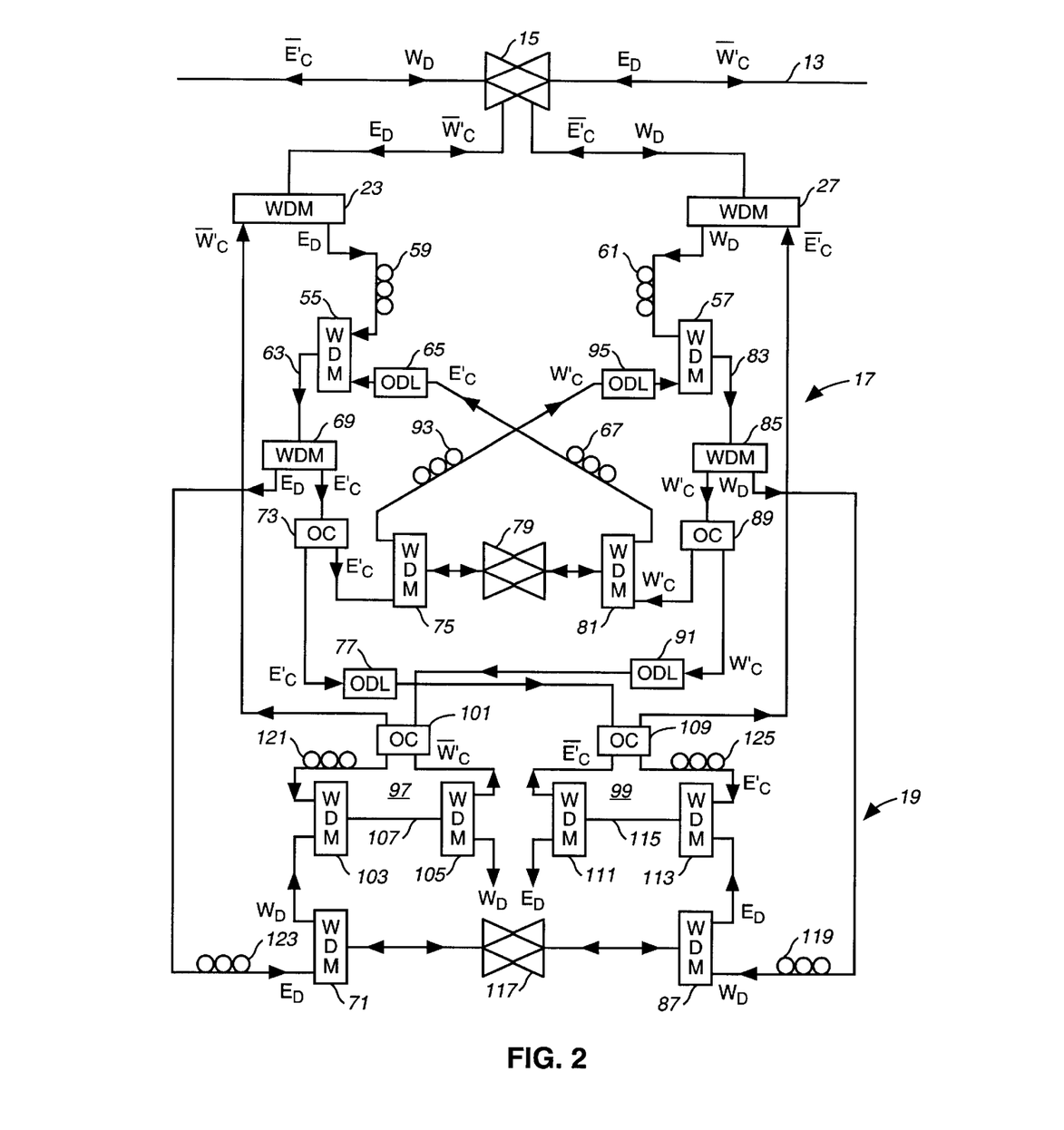
FIG. 2 is an optical circuit diagram of a preferred embodiment of the bi-directional all-optical regenerator of the present invention.

Referring now to FIG. 2, there is shown an optical circuit diagram of a preferred embodiment of the bi-directional all-optical regenerator of the present invention. Signal $E_D$ is received at clock recovery loop 17 from WDM 23 at an input of a WDM 55. Similarly, data signal $W_D$ is received from WDM 27 at an input of a WDM 57. A polarization controller 59 is disposed in the optical path of data signal $E_D$ between WDM 23 and WDM 55. Similarly, a polarization controller 61 is disposed in the optical path of data signal $W_D$ between WDM 27 and WDM 57.

WDM 55 multiplexes data signal $E_D$ with recovered clock signal $E'_C$ onto a section of optical fiber 63. The velocity dispersion of fiber 63 is chosen carefully to be near zero at the nominal wavelengths of data signal $E_D$ and clock signal $E'_C$ to assure that the copropagating waves will remain congruent while traveling together in fiber 63. A variable optical delay line 65 is disposed in the optical path of recovered clock signal $E'_C$ into WDM 55 to insure that $E_D$ and $E'_C$ travel together through optical fiber 63. Additionally, a polarization controller 67 is disposed in the path of clock signal $E'_C$, to ensure that clock signal $E'_C$ and data signal $E_D$ enter fiber 63 in the same polarization state. Data signal $E_D$ is amplified by bi-directional line amplifier 15 and clock signal $E'_C$ is amplified by a controllable gain bi-directional line amplifier 79 so that the power is high enough to drive fiber 63 into non-linearity to exhibit the Kerr effect. Fiber 63 is coupled to a WDM 69 which separates data signal $E_D$ from recovered clock signal $E'_C$. Data signal $E_D$ is coupled to optical gate 19 through a WDM 71. Clock signal $E'_C$ from WDM 69 is coupled to an optical coupler 73, which splits clock signal $E'_C$ into a first portion which is coupled back into clock recovery loop 17 through a WDM 75 and a second portion, which is coupled into optical gate 19 through a variable optical delay line 77. WDM 75 is bi-directionally coupled to a controllable gain bi-directional line amplifier 79, which in turn is coupled to a WDM 81. An output of WDM 81 couples recovered clock signal $E'_C$ back to WDM 51 through polarization controller 67 and optical delay line 65. Thus, WDM 65, optical fiber 63, WDM 69, optical coupler 73, WDM 75, bi-directional line amplifier 79, WDM 81, polarization controller 67 and optical delay line 65 perform a first clock recovery circuit that recovers a clock signal $E'_C$ from data signal $E_D$.

Similarly, WDM 57 multiplexes data signal $W_D$ with recovered clock signal $W'_C$, onto a section of optical fiber 83. Optical fiber 83 is coupled to a WDM 85 that separates data signal $W_D$ from recovered clock signal $W'_C$. Data signal $W_D$ from WDM 85 is coupled into optical gate 19 through a WDM 87. Recovered clock signal $W'_C$ from WDM 85 is coupled to an optical coupler 89 that splits recovered clock signal $W'_C$ into a first portion, which is coupled back to clock recovery loop 17 through WDM 81, and a second portion, which is coupled into gate 19 through a variable optical delay line 91.

Recovered clock signal W'$_C$ is amplified by bi-directional line amplifier 79 and coupled back to WDM 57 through WDM 75. A polarization controller 93 and a variable optical delay line 95 are disposed in the optical path of recovered clock signal W'$_C$ between WDM 75 and WDM 57 to ensure maximum interaction of recovered clock signal W'$_C$, and data signal W$_D$ in optical fiber section 83 between WDM 57 and WDM 85.

Thus, WDM 57, optical fiber 83, WDM 85, optical coupler 89, WDM 81, bi-directional line amplifier 79, WDM 75, polarization controller 93, and optical delay line 95, with their respective connections, form a second optical clock recovery that recovers clock signal W'$_C$ from data signal W$_D$. It will be noted that the first and second clock recovery circuits share WDM 75, bi-directional line amplifier 79, and WDM 81.

In the embodiment of FIG. 2, bi-directional optical gate 19 includes a west non-linear optical loop mirror (NOLM) 97 and an east NOLM 99. West NOLM 97 includes an optical coupler 101, a WDM 103, and a WDM 105. A length of optical fiber 107 is coupled between WDM 103 and WDM 105. Similarly, east NOLM includes an optical coupler 109 and WDMs 111 and 113 with a section of optical fiber 115 coupled therebetween. A variable gain bi-directional line amplifier 117 is bi-directionally coupled between WDM 71 and WDM 87. WDM 71 is coupled to WDM 103 of west NOLM 97, and WDM 87 is coupled to WDM 113 of east NOLM 99.

Recovered clock signal W'$_C$ is received by west NOLM 97 at optical coupler 101. Optical coupler 101 splits recovered clock signal W'$_C$ into two signal halves that traverse west NOLM 97 in opposite directions. WDM 103 multiplexes data signal W$_D$ with the counterclockwise half of recovered clock signal W'$_C$ onto optical fiber section 107. Optical delay line 109 is variable so that signals W$_D$ and W'$_C$ travel through fiber 115 together. Polarization controller 119 and 121 are disposed in the paths of signals W$_D$ and W'$_C$, respectively, to ensure maximum cross modulation in fiber 107. WDM 105 separates regenerated west signal $\overline{W'_C}$ from original data signal W$_D$. Regenerated signal $\overline{W'_C}$ is coupled back to WDM 23 through optical coupler 101. similarly, east NOLM 99 regenerates the east signal by multiplexing recovered clock signal E'$_C$ with data signal E$_D$ onto optical fiber 115. Polarization controllers 123 and 125 are disposed in the paths of signals E$_D$ and E'$_C$, respectively, to ensure maximum cross modulation within optical fiber 115. Regenerated signal $\overline{E'_C}$ is coupled back to WDM 127 through optical coupler 109. It will be noted in FIG. 2 that WDM 71, WDM 87, and variable gain bi-directional line amplifier 117 are common to both west NOLM 97 and east NOLM 99. The gain of line amplifier 117 is controllable to ensure that the power sufficient to drive NOLMs 97 and 99 into non-linearity. Preferably line amplifier is controlled so as not to drive NOLMs 97 and 99 into saturation, thereby to control the bias of NOLMs 97 and 99.

Figure 3:
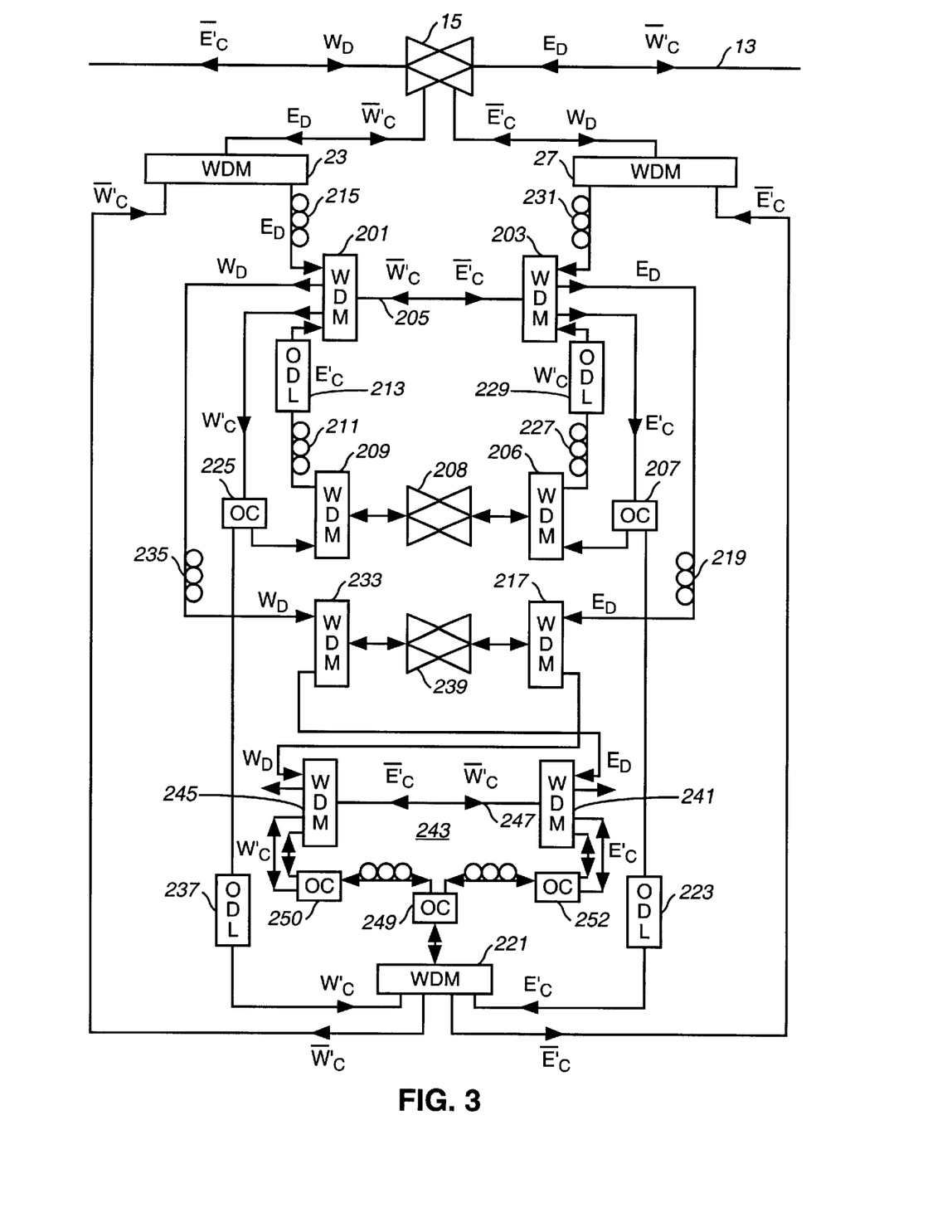
FIG. 3 is an optical circuit diagram of an alternative embodiment of the bi-directional all-optical regenerator of the present invention.

Referring now to FIG. 3, there is shown an alternative embodiment of the bi-directional all-optical regenerator of the present invention. The regenerator of FIG. 3 includes a bi-directional clock recovery loop 17a and a bi-directional optical gate 19a. Clock recovery loop 17a includes a WDM 201 and a WDM 203 with a section of optical fiber 205 bi-directionally coupled therebetween. The first optical clock recovery circuit of loop 17a includes an optical coupler 207 coupled between WDM 203 and a WI)M 206. WDM 206 is bi-directionally coupled to a controllable gain bi-directional line amplifier 207, which in turn is coupled to a WDM 209. WDM 209 is coupled back to WDM 201 through a polarization controller 211 and a variable optical delay line 213. Data signal E$_D$ is received from WDM 23 through a polarization controller 215 at WDM 201. WDM 201 multiplexes data signal E$_D$ with recovered clock signal E'$_C$ onto optical fiber 205. WDM 203 separates data signal E$_D$ from recovered clock signal E'$_C$. Data signal E$_D$ is coupled from WDM 203 to a WDM 217 of optical gate 19a through a polarization controller 219. Recovered clock signal E'$_C$ is coupled by optical coupler 207 to a WDM 221 of optical gate 19 through a variable optical delay line 223.

The second optical clock recovery circuit of clock recovery loop 17a includes WDM 203, optical fiber 205, and WDM 201, as well as WDM 209, bi-directional line amplifier 208, and WDM 206. Additionally, the second optical clock recovery circuit includes an optical coupler 225 which couples recovered clock signal W'$_C$ from WDM 201 to WDM 209. Recovered clock signal W'$_C$ is coupled from WDM 206 to WDM 203 through a polarization controller 227 and a variable optical delay line 229. Data signal W$_D$ is coupled to the second clock recovery circuit by WDM 203. A polarization controller 231 is disposed in the optical path of data signal W$_D$ between WDM 27 and WDM 203. Data signal W$_D$ is coupled from WDM 201 to a WDM 233 of optical gate 19a through a polarization controller 235. Recovered clock signal W'$_C$ is coupled from WDM 201 to WDM 221 of optical gate 19a through optical coupler 225 and a variable optical delay line 237. Thus, in the embodiment of FIG. 3, the first and second optical clock recovery circuits share a common optical fiber 205 and a common bi-directional line amplifier 208.

In the optical gate of the embodiment of FIG. 3, a controllable gain bi-directional line amplifier 239 is coupled between WDM 217 and WDM 233. Data signal W$_D$ is received at WDM 233 and amplified by bi-directional line amplifier 239. Similarly, data signal E$_D$ is received at WDM 217 and amplified by bi-directional line amplifier 239. Data signal E$_D$ is coupled from WDM 233 to a WDM 241 of an NOLM 243. Data signal W$_D$ is coupled from WDM 217 to a WDM 245 of NOLM 243. An optical fiber 247 is coupled between WDM 241 and 245. Recovered clock signals W'$_C$ and E'$_C$ are multiplexed into NOLM 243 by WDM 221. The multiplexed signals W'$_C$ and E'$_C$ are split by an optical coupler 249, and each of signals W'$_C$ and E'$_C$ travel in both directions around NOLM 243. The line carrying signals W'$_C$ and E'$_C$ in the clockwise direction is split by an optical coupler 250, and the line carrying signals W'$_C$ and E'$_C$ in the counterclockwise direction is split by an optical coupler 252. Data signal E$_D$ and recovered clock signal E'$_C$ are multiplexed by WDM 241 onto optical fiber 247 to produce regenerated signal $\overline{E'_C}$. Similarly, data signal W$_D$ and recovered clock signal W'$_C$ are multiplexed onto optical fiber 247 to produce regenerated signal $\overline{W'_C}$. Regenerated signal $\overline{W'_C}$ is separated from data signal W$_D$ at, WDM 241 and regenerated signal $\overline{E'_C}$ is separated from data signal E$_D$ by WDM 245. Regenerated signals $\overline{E'_C}$ and $\overline{W'_C}$ are separated from each other at WDM 221. Regenerated signal $\overline{W'_C}$ is coupled back to optical fiber 13 by WDM 23. Similarly, regenerated signal $\overline{E'_C}$ is coupled back to fiber 13 by WDM 27.

From the foregoing, it may be seen that the present invention provides a bi-directional all-optical regenerator that is economical in terms of both cost and facilities rack space. The clock recovery circuits and the and the NOLM or NOLMs share common optical circuit elements. By causing signals to travel in opposite directions through the common optical circuit elements, the total number of elements is reduced without affecting performance of the regenerator.

The present invention has been described and illustrated with reference to preferred embodiments. Those skilled in the art will recognize that features and subcombinations of elements described and illustrated may be used independently of or in combination with other elements and subcombinations. For example, optical gate 19a may be used in combination with clock recovery loop 17, or optical gate 19 may be used in combination with clock recovery loop 17a, all as would be apparent to one skilled in the art, given the benefit of the foregoing disclosure. Accordingly, the spirit and scope of the present invention is set forth in the appended claims.

What is claimed is:

1. A bi-directional all-optical regenerator, comprising:
   a bi-directional clock recovery loop including:
      a first optical signal input arranged to receive a first signal in a first direction;
      a second optical signal input arranged to receive a second signal in a direction opposite said first direction;
      a first recovered clock signal output arranged to output an optical clock signal recovered from said first optical signal;
      a second recovered clock signal output arranged to output an optical clock signal recovered from said second optical signal;
      a first optical signal output arranged to output said first optical signal;
      a second optical signal output arranged to output said second optical signal;
      a first wave division multiplexer having a first input coupled to said first optical signal input of said clock recovery loop and a second input coupled to a bi-directional optical amplifier; and,
      a second wave division multiplexer having a first input coupled to said second optical signal input of said clock recovery loop and a second input coupled to said bi-directional optical amplifier; and,
   a bi-directional optical gate including:
      a first recovered clock signal input coupled to said first recovered clock signal output of said bi-directional clock recovery loop;
      a second recovered clock signal input coupled to said second recovered clock signal output of said bi-directional clock recovery loop;
      a first optical signal input coupled to said first optical signal output of said bi-directional clock recovery loop;
      a second optical signal input coupled to said second optical signal output of said bi-directional clock recovery loop;
      a first regenerated optical signal output; and,
      a second regenerated optical signal output.

2. The bi-directional all-optical regenerator as claimed in claim 1, wherein said bi-directional clock recovery loop further comprises:
   a third wavelength division multiplexer bi-directionally coupled to said bi-directional optical amplifier and having an output coupled to said second input of said second wavelength division multiplexer; and,
   a fourth wavelength division multiplexer bi-directionally coupled to said bi-directional optical amplifier and having an output coupled to said second input of said first wavelength division multiplexer.

3. The bi-directional all-optical regenerator as claimed in claim 2, wherein said bi-directional clock recovery loop further comprises:
   a first optical delay line coupled between the output of said third wavelength division multiplexer and said second input of said second wavelength division multiplexer; and,
   a second optical delay line coupled between the output of said fourth wavelength division multiplexer and said second input of said first wavelength division multiplexer.

4. The bi-directional all-optical regenerator as claimed in claim 2, wherein said bi-directional clock recovery loop further comprises:
   a first optical fiber having a non-linear index of refraction coupled to an output of said first wavelength division multiplexer and to an input of a fifth wavelength division multiplexer; and,
   a second optical fiber coupled to an output of said second wavelength division multiplexer and to an input of a sixth wavelength division multiplexer.

5. The bi-directional all-optical regenerator as claimed in claim 4, wherein:
   said fifth wavelength division multiplexer includes a first output coupled to said first optical signal output of said bi-directional clock recovery loop and a second output coupled to said first recovered clock signal output of said bi-directional clock recovery loop and to an input of said third wavelength division multiplexer; and,
   said sixth wavelength division multiplexer includes a first output coupled to said second optical signal output of said bi-directional clock recovery loop and a second output coupled to said second clock signal output of said bi-directional clock recovery loop and to an input of said fourth wavelength division multiplexer.

6. The bi-directional all-optical regenerator as claimed in claim 1, wherein said bi-directional clock recovery loop further comprises:
   a third wavelength division multiplexer bi-directionally coupled to said bi-directional optical amplifier and having an output coupled to said second input of said first wavelength division multiplexer; and,
   a fourth wavelength division multiplexer bi-directionally coupled to said bi-directional optical amplifier and having an output coupled to said second input of said second wavelength division multiplexer.

7. The bi-directional all-optical regenerator as claimed in claim 6, wherein said bi-directional clock recovery loop further comprises:
   a first optical delay line coupled between the output of said third wavelength division multiplexer and said second input of said first wavelength division multiplexer; and,
   a second optical delay line coupled between the output of said fourth wavelength division multiplexer and said second input of said second wavelength division multiplexer.

8. The bi-directional all-optical regenerator as claimed in claim 6, wherein said bi-directional clock recovery loop further comprises:
   an optical fiber bi-directionally coupled between said first wavelength division multiplexer and said second wavelength division multiplexer.

9. The bi-directional all-optical regenerator as claimed in claim 8, wherein:

said first wavelength division multiplexer includes a first output coupled to said second optical signal output of said bi-directional clock recovery loop and a second output coupled to an input of said third wavelength division multiplexer and to said second clock signal output of said bi-directional clock recovery loop; and, said second wavelength division multiplexer includes a first output coupled to said first optical signal output of said bi-directional clock recovery loop and a second output coupled to an input of said fourth wavelength division multiplexer and to said first clock signal output of said bi-directional clock recovery loop.

10. A bi-directional all-optical regenerator, comprising:
a bi-directional clock recovery loop including:
   a first optical signal input arranged to receive a first signal in a first direction;
   a second optical signal input arranged to receive a second signal in a direction opposite said first direction;
   a first recovered clock signal output arranged to output an optical clock signal recovered from said first optical signal;
   a second recovered clock signal output arranged to output an optical clock signal recovered from said second optical signal;
   a first optical signal output arranged to output said first optical signal; and,
   a second optical signal output arranged to output said second optical signal; and,
a bi-directional optical gate including:
   a first recovered clock signal input coupled to said first recovered clock signal output of said bi-directional clock recovery loop;
   a second recovered clock signal input coupled to said second recovered clock signal output of said bi-directional clock recovery loop;
   a first optical signal input coupled to said first optical signal output of said bi-directional clock recovery loop;
   a second optical signal input coupled to said second optical signal output of said bi-directional clock recovery loop;
   a first regenerated optical signal output;
   a second regenerated optical signal output;
   a first optical coupler coupled to said first clock signal input and to said first regenerated signal output;
   a second optical coupler coupled to said second clock signal input and to said second regenerated signal output;
   a first wavelength division multiplexer having an input coupled to said first optical signal input of said bi-directional optical gate;
   a second wavelength division multiplexer having an input coupled to said second optical signal input of said bi-directional optical gate;
   a bi-directional optical amplifier bi-directionally coupled between said first wavelength division multiplexer and said second wavelength division multiplexer;
   a third wavelength division multiplexer having a first input coupled to said first optical coupler and a second input coupled to an output of said second wavelength division multiplexer;
   a fourth wavelength division multiplexer having a first input coupled to said second optical coupler and a second input coupled to an output of said first wavelength division multiplexer;
   a fifth wavelength division multiplexer bi-directionally coupled to said third wavelength division multiplexer through a first optical fiber and having a first output coupled to said first optical coupler and a second output; and,
   a sixth wavelength division multiplexer bi-directionally coupled to said fourth wavelength division multiplexer through a second optical fiber and having a first output coupled to said second optical coupler and a second output.

11. The bi-directional all-optical regenerator as claimed in claim 10, wherein said bi-directional optical gate further comprises:
   a first optical delay line coupled between said first clock signal input and said first optical coupler; and,
   a second optical delay line coupled between said second clock signal input and said second optical coupler.

12. The bi-directional all-optical regenerator as claimed in claim 10, wherein said bi-directional optical gate further comprises:
   a first polarization controller coupled between said first optical coupler and said third wavelength division multiplexer; and,
   a second polarization controller coupled between said second optical coupler and said fourth wavelength division multiplexer.

13. A bi-directional all-optical regenerator, comprising:
a bi-directional clock recovery loop including:
   a first optical signal input arranged to receive a first signal in a first direction;
   a second optical signal input arranged to receive a second signal in a direction opposite said first direction;
   a first recovered clock signal output arranged to output an optical clock signal recovered from said first optical signal;
   a second recovered clock signal output arranged to output an optical clock signal recovered from said second optical signal;
   a first optical signal output arranged to output said first optical signal; and,
   a second optical signal output arranged to output said second optical signal; and,
a bi-directional optical gate including:
   a first recovered clock signal input coupled to said first recovered clock signal output of said bi-directional clock recovery loop;
   a second recovered clock signal input coupled to said second recovered clock signal output of said bi-directional clock recovery loop;
   a first optical signal input coupled to said first optical signal output of said bi-directional clock recovery loop;
   a second optical signal input coupled to said second optical signal output of said bi-directional clock recovery loop;
   a first regenerated optical signal output;
   a second regenerated optical signal output;
   a first wavelength division multiplexer having a first input coupled to said first clock signal input, a second input coupled to said second clock signal input, a first output coupled to said first regenerated signal output, and a second output coupled to said second regenerated signal output;
   a second wavelength division multiplexer having a first input coupled to said first optical signal input, a first bi-directional input coupled to said first wavelength division multiplexer, a second bi-directional input coupled to said first wavelength division multiplexer, and a first output;

a third wavelength division multiplexer having a first input coupled to said second optical signal input, a first bi-directional input coupled to said first wavelength division multiplexer, a second bi-directional input coupled to said first wavelength division multiplexer, and a first output; and, an optical fiber bi-directionally coupled between third bi-directional inputs of said second and third wavelength division multiplexers.

14. A bi-directional all-optical regenerator, comprising:
a bi-directional clock recovery loop including:
   a first optical signal input arranged to receive a first signal in a first direction;
   a second optical signal input arranged to receive a second signal in a direction opposite said first direction;
   a first recovered clock signal output arranged to output an optical clock signal recovered from said first optical signal;
   a second recovered clock signal output arranged to output an optical clock signal recovered from said second optical signal;
   a first optical signal output arranged to output said first optical signal; and,
   a second optical signal output arranged to output said second optical signal; and,
a bi-directional optical gate including:
   a first recovered clock signal input coupled to said first recovered clock signal output of said bi-directional clock recovery loop;
   a second recovered clock signal input coupled to said second recovered clock signal output of said bi-directional clock recovery loop;
   a first optical signal input coupled to said first optical signal output of said bi-directional clock recovery loop;
   a second optical signal input coupled to said second optical signal output of said bi-directional clock recovery loop;
   a first regenerated optical signal output;
   a second regenerated optical signal output;
   a bi-directional optical amplifier;
   a first wavelength division multiplexer having an input coupled to said first optical signal input, a bi-directional signal input coupled to said bi-directional optical amplifier, and a first output; and,
   a second wavelength division multiplexer having an input coupled to said second optical signal input, a bi-directional signal input coupled to said bi-directional optical amplifier, and a first output.

15. The bi-directional all-optical regenerator as claimed in claim 14, wherein said bi-directional optical gate further comprises:
   a first non-linear optical loop mirror having an optical signal input coupled to said first output of said second wavelength division multiplexer, a clock signal input coupled to said first recovered clock signal input, and a regenerated signal output coupled to said first regenerated signal output; and,
   a second non-linear optical loop mirror having an optical signal input coupled to said first output of said first wavelength division multiplexer, a clock signal input coupled to said second recovered clock signal input, and a regenerated signal output coupled to said second regenerated signal output.

16. A system for regenerating a first optical signal carried in a first direction on an optical transmission medium and a second optical signal carried in a second direction on said optical transmission medium, which comprises:
   a bi-directional clock recovery loop including a first optical clock recovery circuit for recovering a first clock signal from said first optical signal and a second optical clock recovery circuit for recovering a second clock signal from said second optical signal, wherein said first and second optical circuits of said clock recovery loop share at least some common optical circuit elements; and,
   a bi-directional optical gate including first non-linear optical light mirror circuit for producing a first regenerated signal based on said first optical signal and said first clock signal and a second non-linear optical light mirror circuit for producing a regenerated signal based on said second optical signal and said second clock signal, wherein said first and second non-linear optical light mirror circuits share at least some common optical circuit elements.

17. The system as claimed in claim 16, wherein said first and second clock recovery circuits share a common bi-directional light amplifier.

18. The system as claimed in claim 16, wherein said first and second clock recovery circuits share a common optical fiber.

19. The system as claimed in claim 16, wherein said first and second clock recovery circuits share a common bi-directional light amplifier and a common optical fiber.

20. The system as claimed in claim 16, wherein said first and second non-linear optical light mirror circuits share a common bi-directional light amplifier.

21. The system as claimed in claim 16, wherein said first and second non-linear optical light mirror circuits share a common optical fiber.

22. A bi-directional all-optical clock recovery loop, comprising:
   a first optical signal input arranged to receive a first optical signal in a first direction;
   a second optical signal input arranged to receive a second optical signal in a direction opposite said first direction;
   a first recovered clock signal output arranged to output an optical clock signal recovered from said first optical signal;
   a second recovered clock signal output arranged to output an optical clock signal recovered from said second optical signal;
   a first optical signal output arranged to output said first optical signal;
   a second optical signal output arranged to output said second optical signal;
   a first wave division multiplexer having a first input coupled to said first optical signal input of said clock recovery loop and a second input coupled to a bi-directional optical amplifier; and,
   a second wave division multiplexer having a first input coupled to said second optical signal input of said clock recovery loop and a second input coupled to said bi-directional optical amplifier.

23. The bi-directional all-optical clock recovery loop as claimed in claim 22, further comprising:

a first optical fiber having a non-linear index of refraction coupled to an output of said first wavelength division multiplexer; and, a second optical fiber coupled to an output of said second wavelength division multiplexer.

24. The bi-directional all-optical clock recovery loop as claimed in claim 22, further comprising:

an optical fiber bi-directionally coupled between said first wavelength division multiplexer and said second wavelength division multiplexer.

25. A bi-directional optical gate, comprising:

a first recovered optical clock signal input;

a second recovered optical clock signal input;

a first optical signal input;

a second optical signal input;

a first regenerated optical signal output;

a second regenerated optical signal output;

a first wavelength division multiplexer having a first input coupled to said first clock signal input, a second input coupled to said second clock signal input, a first output coupled to said first regenerated signal output, and a second output coupled to said second regenerated signal output;

a second wavelength division multiplexer having a first input coupled to said first optical signal input, a first bi-directional input coupled to said first wavelength division multiplexer, a second bi-directional input coupled to said first wavelength division multiplexer, and a first output;

a third wavelength division multiplexer having a first input coupled to said second optical signal input, a first bi-directional input coupled to said first wavelength division multiplexer, a second bi-directional input coupled to said first wavelength division multiplexer, and a first output; and an optical fiber bi-directionally coupled between third bi-directional inputs of said second and third wavelength division multiplexers.

26. The bi-directional optical gate as claimed in claim 25, further comprising:

a bi-directional optical amplifier;

a fourth wavelength division multiplexer having an input coupled to said first optical signal input, a bi-directional signal input coupled to said di-directional optical amplifier, and a first output; and, a fifth wavelength division multiplexer having an input coupled to said second optical signal input, a bi-directional signal input coupled to said di-directional optical amplifier, and a first output.

27. The bi-directional optical gate as claimed in claim 26, further comprising:

a first non-linear optical loop mirror having an optical signal input coupled to said first output of said fifth wavelength division multiplexer, a clock signal input coupled to said first recovered clock signal input, and a regenerated signal output coupled to said first regenerated signal output; and, a second non-linear optical loop mirror having an optical signal input coupled to said first output of said fourth wavelength division multiplexer, a clock signal input coupled to said second recovered clock signal input, and a regenerated signal output coupled to said second regenerated signal output.

* * * * *